United States Patent
Chiappo

(10) Patent No.: US 8,101,017 B1
(45) Date of Patent: Jan. 24, 2012

(54) LIGHT-WEIGHT COMPOSITION AND MIX FOR MASONRY, MORTAR AND STUCCO

(76) Inventor: Jorge G Chiappo, St. Petersburg, FL (US)

( * ) Notice: Subject to any disclaimer, the term of this patent is extended or adjusted under 35 U.S.C. 154(b) by 0 days.

(21) Appl. No.: 13/168,412

(22) Filed: Jun. 24, 2011

Related U.S. Application Data

(63) Continuation-in-part of application No. 12/945,941, filed on Nov. 15, 2010, now Pat. No. 7,967,908.

(51) Int. Cl.
| | |
|---|---|
| *C04B 24/04* | (2006.01) |
| *C04B 24/00* | (2006.01) |
| *C04B 24/08* | (2006.01) |
| *C04B 14/06* | (2006.01) |
| *C04B 14/36* | (2006.01) |
| *C04B 22/00* | (2006.01) |

(52) U.S. Cl. ........ 106/728; 106/677; 106/691; 106/696; 106/708; 106/724; 106/737; 106/792; 106/795; 106/796; 106/802; 106/810

(58) Field of Classification Search .................. 106/677, 106/691, 696, 708, 724, 728, 737, 792, 795, 106/796, 802, 810
See application file for complete search history.

(56) References Cited

U.S. PATENT DOCUMENTS

| | | | |
|---|---|---|---|
| 2,890,752 A | 6/1959 | Crone et al. | |
| 5,718,758 A | 2/1998 | Breslauer | |
| 6,537,366 B1 | 3/2003 | Supplee, Sr. | |
| 6,840,996 B2 | 1/2005 | Morioka et al. | |
| 7,070,647 B2 | 7/2006 | Fujimori et al. | |
| 7,148,270 B2 | 12/2006 | Bowe | |
| 7,468,102 B1 | 12/2008 | Chiappo | |
| 7,967,908 B1 * | 6/2011 | Chiappo | ........................ 106/716 |

FOREIGN PATENT DOCUMENTS

JP   55-60055 A   5/1980

* cited by examiner

*Primary Examiner* — Anthony Green

(74) *Attorney, Agent, or Firm* — Larson & Larson, P.A.; Frank Liebenow; Justin Miller

(57) ABSTRACT

An application for a pre-mixed mortar, stucco or masonry composition includes a approximately 75% sand and 25% of a light-weight cement mix comprising a cement (either Portland cement or hydraulic cement), hydrous lime, sodium tall oil, sodium stearate, sodium C14-16 Alpha Olefin, linear alkyl benzene; and silicon dioxide.

17 Claims, No Drawings

LIGHT-WEIGHT COMPOSITION AND MIX FOR MASONRY, MORTAR AND STUCCO

CROSS-REFERENCE TO RELATED APPLICATION

This application is a continuation-in-part of U.S. patent application Ser. No. 12/945,941 titled, "LIGHT-WEIGHT COMPOSITION FOR MASONRY, MORTAR AND STUCCO," filed Nov. 15, 2010, now U.S. Pat. No. 7,967,908 by inventor Jorge G. Chiappo.

This application is related to U.S. Pat. No. 7,468,102 titled, "LIGHT-WEIGHT COMPOSITION FOR MASONRY, MORTAR AND STUCCO," inventor Jorge G. Chiappo.

FIELD OF THE INVENTION

This invention relates to the field of cement and more particularly to a light-weigh composition of pre-mixed cement mix and sand.

BACKGROUND OF THE INVENTION

Mortar and stucco normally consists of the combination of cement and sand in a ratio of approximately three (3) parts sand to one (1) part cement. Directions for specific brands of cement usually call for from 2.25:1 to 3:1 sand to cement ratios. The cement is generally mixed at the job-site in a gasoline or electric powered mortar mixers. Often, the sand is delivered in bulk, while the cement mix is delivered in bags weighing either 78 or 80 pounds. Due to the weight of the bags, they are often delivered on palates and lifted with fork lifts and/or cranes. One bag of cement mix is mixed with approximately three cubic feet of sand. Water is added to achieve a consistency that allows good workability. While the term sand is used throughout this disclosure for ease of discussion, those skilled in the art will recognize that sand may include other heavy aggregates, such as gravel, crushed stone and the like.

Pre-mixed mortar, stucco or masonry mix is a form of concrete that is pre-mixed at the manufacturing site and typically delivered to the job site in packages such as bags. The package (e.g. bag) contains a mixture of sand and concrete and, optionally, other aggregates. Typically, the pre-mixed mortar, stucco or masonry is used by adding water and applying to the job site.

The weight and volume of these bags of pre-mix mortar, stucco or masonry create several problems. During storage, the weight and volume relate to the total storage space required and the cost of transporting within the warehouse. During transportation, the volume and weight affect the total number of bags that fit within a given truck and the fuel consumption required to transport the bags to the construction site. At the construction site, the weight becomes more of an issue since individual bags are often lifted by a worker and many bags are lifted per day, the 78-80 pound bags cause fatigue and are the cause of many stress-related ailments. For home use, smaller bags (e.g. 60 pound bags) are often sold since many homeowners find it difficult to lift 80 pounds.

U.S. Pat. No. 5,718,758 to Breslauer recognizes that mortars of the prior art create problems due to weight, leading to worker injury during carrying of the mortar, etc.

Other cement compositions disclosed in U.S. Pat. No. 6,840,996 to Morioka, et al, U.S. Pat. No. 7,070,647 to Fujimori, et al, and U.S. Pat. No. 7,148,270 to Bowe describe various cement compositions, none of which provide a light-weight ready-mix composition.

U.S. Pat. No. 7,468,102 to Jorge G. Chiappo describes a light-weight cement mix, but not a pre-mixed composition comprising sand.

Existing pre-mixed compositions have a substantial effect on the environment. For example, in Florida alone, around 25 million bags of pre-mix were consumed in 2008, or approximately 1 million tons of material that had to be mined, shipped, hauled and used. By reducing the per-bag weight while producing an equivalent yield by 18 percent, 820 million tons of material would be mined, shipped, hauled and used to create the same amount of finished product. That means, 180M tons less in raw materials mined, transportation costs, wear and tear on vehicles, fossil fuel used in transportation, storage, personal injury, etc. A pre-mix that has these characteristics is very much needed to improve the ecology. The U.S. Pat. No. 7,468,102 patent only addressed a light-weight cement mix, but does not address a light-weight, pre-mixed mortar, stucco or masonry mix that includes sand as in this application.

What is needed is a light-weight, pre-mixed mortar, stucco or masonry mix ready for adding water at the job site.

SUMMARY OF THE INVENTION

In one embodiment, a pre-mixed mortar, stucco or masonry composition is disclosed including from 70 to 80 percent sand and from 20 to 30 percent of a light-weight cement mix composition that comprises a cement (either Portland cement or hydraulic cement), hydrous lime, sodium tall oil, sodium stearate, sodium C14-16 Alpha Olefin, linear alkyl benzene; silicon dioxide and sand.

In another embodiment, a pre-mixed mortar, stucco or masonry composition is disclosed comprising approximately 75 percent sand and approximately 25 percent of a light-weight cement mix composition that includes from 35 to 90 percent hydraulic cement by weight, from 2 to 10 percent hydrous lime by weight, from 1 to 3 percent sodium tall oil by weight, from 1 to 2 percent sodium stearate by weight, from 1 to 2 percent sodium C14-16 Alpha Olefin by weight, from 1 to 3 percent linear alkyl benzene by weight, from 10 to 20 percent silicon dioxide by weight and sand.

In another embodiment, a pre-mixed mortar, stucco or masonry composition is disclosed comprising approximately 75 percent sand and approximately 25 percent of a light-weight cement mix composition that includes from 35 to 90 percent Portland cement by weight, from 2 to 10 percent hydrous lime by weight, from 1 to 3 percent sodium tall oil by weight, from 1 to 2 percent sodium stearate by weight, from 1 to 2 percent sodium C14-16 Alpha Olefin by weight, from 1 to 3 percent linear alkyl benzene by weight, from 10 to 20 percent silicon dioxide by weight and sand.

BRIEF DESCRIPTION OF THE DRAWINGS

The invention can be best understood by those having ordinary skill in the art by reference to the following detailed description.

DETAILED DESCRIPTION OF THE INVENTION

Reference will now be made in detail to the presently preferred embodiments of the invention. Although the disclosed pre-mixed mortar, stucco or masonry mixture is ideal for use in masonry, mortar and stucco, there is no limitation to the application of the mortar, stucco or masonry mix of the present invention.

Prior to the present invention, pre-mixed mortar, stucco or masonry mix is typically delivered to the job site in bags weighing 78 or 80 pounds. The weight of these bags often causes stress and strain injuries to the workers. Additionally, transporting and storage of these bags utilizes more space and energy than is needed. The pre-mixed cement of the present invention provides the same resulting volume of cement with the strength and consistency of the prior art cement mixtures at a per-bag weight of approximately 65 pounds, saving energy and storage space and reducing worker stress and strain. Although 65 pound bags are used as an example, it is known and anticipated to produce the claimed product in any size bag or container including an 80 pound bag that will produce a greater resulting volume than an 80 pound bag of the prior art cement mixtures.

The mortar, stucco or masonry mix of the present invention is mixed with water as the prior mortar, stucco or masonry mixes. Mixing a 65 pound container of the pre-mixed cement mix of the present invention with water, results in a volume is similar to that of an 80 pound container of a pre-mixed cement mix of the prior art. Therefore, a 65 pound bag of the mortar, stucco or masonry mix of the present invention produces a similar amount (volume) of mortar, stucco or masonry when mixed with water as did an 80 pound bag of the prior art.

The pre-mixed mortar, stucco or masonry mix of the present invention consists of approximately 75% sand and a light-weight cement mix composition of from 35% to 90% cement by weight (either Portland cement or hydraulic cement), from 2% to 10% hydrous lime or hydrous magnesium sulfate by weight, from 1% to 3% sodium tall oil (e.g., a wood pulp by-product) by weight, from 1% to 2% sodium stearate by weight, from 1% to 2% sodium $C_{14-16}$ Alpha Olefin by weight, from 1% to 3% linear alkyl benzene by weight and from 10% to 20% silicon dioxide $SiO_2$ (also known as silica or silox) or fly ash by weight. Silicon dioxide $SiO_2$ is often derived from fly ash which is a byproduct of coal combustion. Fly ash also consists of aluminum oxide ($Al_2O_3$) and iron oxide ($Fe_2O_3$).

When a 65 pound bag of pre-mixed cement mix of the present invention is mixed with aggregate and water, it produces a similar amount of product as a 78 or 80 pound bag of pre-mixed cement of the prior art. Therefore, less weight is transported to the job site, less strain is placed upon the workers, yet the same amount of resulting mix is derived. Equivalent and proportional results are achieved with smaller or larger sized bags or containers.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A pre-mixed mortar, stucco or masonry composition comprising:
   70 to 80 percent sand; and
   20 to 30 percent light-weight cement mix composition comprising:
   a cement selected from the group consisting of Portland cement and hydraulic cement;
   hydrous lime;
   sodium tall oil;
   sodium stearate;
   sodium $C_{14-16}$ Alpha Olefin;
   linear alkyl benzene;
   silicon dioxide.

2. The pre-mixed mortar, stucco or masonry composition of claim 1, wherein the light-weight cement mix composition comprises from 35 to 90 percent Portland cement by weight.

3. The pre-mixed mortar, stucco or masonry composition of claim 1, wherein the light-weight cement mix composition comprises from 35 to 90 percent hydraulic cement by weight.

4. The pre-mixed mortar, stucco or masonry composition of claim 1, wherein the light-weight cement mix composition comprises from 2 to 10 percent hydrous lime by weight.

5. The pre-mixed mortar, stucco or masonry composition of claim 1, wherein the light-weight cement mix composition comprises from 1 to 3 percent sodium tall oil by weight.

6. The pre-mixed mortar, stucco or masonry composition of claim 1, wherein the light-weight cement mix composition comprises from 1 to 2 percent sodium stearate by weight.

7. The pre-mixed mortar, stucco or masonry composition of claim 1, wherein the light-weight cement mix composition comprises from 1 to 2 percent sodium $C_{14-16}$ Alpha Olefin by weight.

8. The pre-mixed mortar, stucco or masonry composition of claim 1, wherein the light-weight cement mix composition comprises from 1 to 3 percent linear alkyl benzene by weight.

9. The pre-mixed mortar, stucco or masonry composition of claim 1, wherein the light-weight cement mix composition comprises from 10 to 20 percent silicon dioxide by weight.

10. The pre-mixed mortar, stucco or masonry composition of claim 1, wherein the pre-mixed mortar, stucco, or masonry composition is provided in a 65 pound bag.

11. The pre-mixed mortar, stucco or masonry composition of claim 10, wherein mixing the contents of the 65 pound bag with water produces an equivalent amount of pre-mixed mortar, stucco or masonry composition as a standard 80 pound bag pre-mixed mortar, stucco or masonry composition.

12. A pre-mixed mortar, stucco or masonry composition comprising:
    approximately 75% sand; and
    approximately 25% light-weight cement mix, the light weight cement mix comprising:
    35 to 90 percent hydraulic cement by weight;
    2 to 10 percent hydrous lime by weight;
    1 to 3 percent sodium tall oil by weight;
    1 to 2 percent sodium stearate by weight;
    1 to 2 percent sodium $C_{14-16}$ Alpha Olefin by weight;
    1 to 3 percent linear alkyl benzene by weight;
    10 to 20 percent silicon dioxide by weight.

13. The pre-mixed mortar, stucco or masonry composition of claim 12, wherein the pre-mixed mortar, stucco or masonry composition is provided in 65 pound bags.

14. The pre-mixed mortar, stucco or masonry composition of claim 13, wherein mixing the contents of the 65 pound bag with water produces an equivalent amount of pre-mixed mortar, stucco or masonry composition as a standard 80 pound bag pre-mixed mortar, stucco or masonry composition.

15. A pre-mixed mortar, stucco or masonry composition comprising:
    approximately 75% sand; and
    approximately 25% light-weight cement mix, the light weight cement mix comprising:
    35 to 90 percent Portland cement by weight;

2 to 10 percent hydrous lime by weight;
1 to 3 percent sodium tall oil by weight;
1 to 2 percent sodium stearate by weight;
1 to 2 percent sodium $C_{14-16}$ Alpha Olefin by weight;
1 to 3 percent linear alkyl benzene by weight;
10 to 20 percent silicon dioxide by weight.

16. The pre-mixed mortar, stucco or masonry composition of claim 15, wherein the pre-mixed mortar, stucco, or masonry composition is provided in 65 pound bags.

17. The pre-mixed mortar, stucco or masonry composition of claim 16, wherein mixing the contents of the 65 pound bag with water produces an equivalent amount of pre-mixed mortar, stucco or masonry composition as a standard 80 pound bag pre-mixed mortar, stucco or masonry composition.

* * * * *